United States Patent Office 2,734,043
Patented Feb. 7, 1956

2,734,043

SOLUTIONS OF POLYPYRROLIDONE

Milton Crowther, Valley Falls, R. I., assignor to Arnold, Hoffman & Co., Incorporated, Providence, R. I., a corporation of Rhode Island No Drawing. Application February 24, 1953,
Serial No. 338,558

8 Claims. (Cl. 260—31.2)

The present invention relates to polymer compositions and, more particularly, to new and useful compositions containing polypyrrolidone.

The principal object of the invention is the provision of highly useful solutions of polypyrrolidone. Another and more specific object of the invention is to provide polypyrrolidone solutions which are particularly adapted for the production of improved polypyrrolidone films and fibers, although suitable for a variety of other uses. Further objects will appear hereinafter.

The foregoing objects are realized, according to the present invention, by virtue of the discovery that solutions of polypyrrolidone in at least substantially anhydrous formic acid containing not more than three parts, by weight, of formic acid per part of polypyrrolidone and diluted with a non-solvent for the polypyrrolidone, particularly a lower aliphatic or chloroaliphatic acid, possess, among other desirable characteristics, exceptionally attractive fiber and film forming properties. Solutions of polypyrrolidone in substantially anhydrous formic acid, suitable for use in the formation of fibers and films are described in co-pending application Ser. No. 338,553, filed on even date herewith, of Barnes, Ney, and Nummy. The films and fibers produced according to the above-mentioned application Serial No. 338,553, now U. S. Patent 2,711,398, possess highly desirable characteristics, e. g., toughness, dyeability and water-permeability. However, it has now been found that by diluting the solutions described in Ser. No. 338,553, now U. S. Patent 2,771,398, with a diluent which is a non-solvent for polypyrrolidone, e. g., one or more lower aliphatic and chloroaliphatic acids, film and fiber forming solutions are obtained which demonstrate a number of improved characteristics. For example, these solutions demonstrate increased stability against degradation on standing, or when exposed to moisture. In addition, use of the lower aliphatic or chloroaliphatic acids according to the invention effectively dilutes the formic acid solution of polypyrrolidone to a viscosity which is best adapted for film of fiber production without injury to the resulting products and, in some cases, improving certain characteristics, e. g., transparency and strength.

Polypyrrolidone possessing film and fiber forming characteristics suitable for use in the present invention is described in the copending application of Ney, Nummy and Barnes, Serial No. 260,558, filed December 7, 1951, now issued as U. S. Patent 2,638,463 of May 12, 1953, can be prepared according to the procedures described therein. Polypyrrolidone of widely varying molecular weight can be used according to the invention, but, to obtain films possessing most desirable characteristics, the polymer should have a molecular weight corresponding to a relative viscosity falling within the range of 2 to 10, as determined by the relative viscosity of a 1% solution thereof in meta-cresol. For best results, the polypyrrolidone utilized should have a relative viscosity of between 3.0 and 6.0.

The formic acid used for dissolving the polypyrrolidone must be anhydrous, or at least substantially so, e. g., 98 to 100%. Dissolution of the polypyrrolidone in the acid can be effected in any convenient manner, e. g., by simply mixing the polymer and solvent together, preferably while heating to a temperature of 30° C. to 50° C., although heat is not essential. The quantity of formic acid in the present solution should not exceed, in parts by weight, three parts formic acid to one part polypyrrolidone for, otherwise, satisfactory films or fibers cannot be obtained. Generally, not less than 1.2 parts formic acid per part of polypyrrolidone are used with 1.5 parts formic acid preferred.

As indicated above, compounds which are non-solvents for polypyrrolidone and can be used as diluents according to the invention are the lower aliphatic and chloroaliphatic acids. These are acetic, propionic, butyric, isobutyric acids and their mono and dichloro derivatives, chloroacetic acid, alpha chloro propionic, alpha chloro butyric, and the like.

It will be understood that various other auxiliary agents, normally used by those skilled in the art to modify the properties of film and fiber forming compositions, may be incorporated in the solutions of the invention. Typical of such modifying agents are pigments, fillers, dyes and synthetic resins.

As indicated above, the present compositions are particularly useful in the production of films which are characterized by their extreme toughness, flexibility, water-permeability and ready dyeability. Such films may be obtained, using any of the conventional procedures for forming polymer films or coatings, such as casting, dipping, extruding or spraying with subsequent removal of the solvent. As will be appreciated, the resulting products are suitable for a wide variety of uses, for example, as dialyzers or in food packaging. In addition, the products of the invention may be used as spinning solutions in conventional wet and dry spinning procedures for producing tough and otherwise desirable polypyrrolidone filaments and fibers capable of being cold drawn or two-way stretched. Such spinning solutions may have included therein conventional fiber-modifying agents, for example, dyestuffs of desired shade by which dyeing in the mass may be effected. Other uses for the solutions of the invention include their application as coatings for natural or synthetic fibers and filaments, e. g., nylon, cotton, wool, rayon, glass and the like, as such, or in fabric form, and aqueous dispersions and emulsions prepared with the aid of appropriate dispersing or emulsifying agents for use as textile assistants and the like.

The invention, as above-described, is further illustrated, but not limited, by the following examples, wherein parts are by weight.

Example I

Two parts of polypyrrolidone (with relative viscosity of 4 for a 1% solution in meta-cresol) is added with stirring to three parts of anhydrous formic acid (98 to 100%), and then one part of glacial acetic acid was added. The mixture was stirred until the polypyrrolidone has dissolved and then allowed to stand until bubbles had disappeared. This dope could be readily cast and on drying gave tough films.

After standing for two weeks, the viscosity of the solution had not changed, and films obtained from it were as tough as the original ones.

Example II

A polypyrrolidone solution was prepared as above with the exception that two parts of glacial acetic acid was used in place of one part. On casting, this solution was extremely thin but tough and otherwise satisfactory films were obtained.

By adding ten parts of glacial acetic acid instead of two parts, solutions were obtained that could be used for dipping of various articles to coat them with a thin film of polypyrrolidone.

If, instead of five parts of glacial acetic acid, one used five parts of formic acid, the thin film obtained was opaque and very fragile.

*Example III*

Example I was repeated with the exception that butyric acid was used in place of acetic acid. Similar results were obtained.

*Example IV*

Six grams of polypyrrolidone were triturated with twelve grams of propionic acid until all the polymer was thoroughly wetted. Nine grams of 98–100% formic acid were added and stirred in. The result was a clear homogeneous dope. This dope, when spread in a thin layer on a glass plate and allowed to dry, gave a tough, transparent film.

*Example V*

Six grams of polypyrrolidone were dissolved in nine grams of 98–100% formic acid. The resulting viscous dope was diluted with nine grams of acetic acid and one gram of dichloroacetic acid. A thin layer of this dope dried to a tough, transparent film.

As many apparently widely different embodiments of this invention may be made without departing from the spirit and scope thereof, it is to be understood that the invention is not limited to the specific embodiment thereof except as defined in the appended claims. For example, the amount of diluent that may be used can be varied over a wide range and depends primarily on the viscosity which it is desired the final solution should have. Generally, however, the diluent is used in the range of from less than one to more than forty parts by weight per part of polypyrrolidone.

I claim:

1. A composition of matter comprising polypyrrolidone dissolved in at least substantially anhydrous formic acid, said composition containing, by weight, not more than three parts of formic acid per part of polypyrrolidone and being diluted with a non-solvent for the polypyrrolidone selected from the group consisting of aliphatic acids having 2 to 4 carbon atoms and chloroaliphatic acids having from 2 to 4 carbon atoms.

2. A composition as claimed in claim 1 wherein said non-solvent is acetic acid.

3. A composition as claimed in claim 1 wherein said non-solvent is chloroacetic acid.

4. A composition as claimed in claim 1 wherein the polypyrrolidone has a relative viscosity of from 2.5 to 10.

5. A composition as claimed in claim 4 wherein the polypyrrolidone has a relative viscosity of from 3.0 to 6.0

6. A composition as claimed in claim 1 containing per part polypyrrolidone from 1.2 to 3 parts by weight of formic acid.

7. A composition as claimed in claim 1 containing per part polypyrrolidone 1.5 parts by weight of formic acid.

8. A composition as claimed in claim 1 containing per part polypyrrolidone from 1.2 to 3 parts by weight of formic acid and from 1 to 40 parts of non-solvent an acid selected from the group consisting of aliphatic acids having 2 to 4 carbon atoms and chloroaliphatic acids having 2 to 4 carbon atoms.

References Cited in the file of this patent

UNITED STATES PATENTS 2,638,463     Ney et al. _____ May 12, 1953